United States Patent
Schrag et al.

(10) Patent No.: US 10,064,339 B2
(45) Date of Patent: Sep. 4, 2018

(54) SYSTEM AND METHOD FOR CONTROLLING BALE WEIGHT

(71) Applicant: AGCO Corporation, Hesston, KS (US)

(72) Inventors: Thomas G. Schrag, Hesston, KS (US); Larry D. Retzlaff, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 4 days.

(21) Appl. No.: 15/355,355

(22) Filed: Nov. 18, 2016

(65) Prior Publication Data

US 2017/0156268 A1 Jun. 8, 2017

Related U.S. Application Data

(60) Provisional application No. 62/262,256, filed on Dec. 2, 2015.

(51) Int. Cl.
| | | |
|---|---|---|
| *A01F 15/08* | (2006.01) | |
| *G01G 19/20* | (2006.01) | |
| *G01G 13/285* | (2006.01) | |
| *G01G 19/10* | (2006.01) | |

(52) U.S. Cl.
CPC ..... *A01F 15/0825* (2013.01); *G01G 13/2851* (2013.01); *G01G 19/10* (2013.01)

(58) Field of Classification Search
CPC ................ A01F 15/08; A01F 15/0825; G01G 13/28511; G01G 19/10
USPC .......................................................... 701/50
See application file for complete search history.

(56) References Cited

U.S. PATENT DOCUMENTS

| | | | |
|---|---|---|---|
| 3,022,723 A * | 2/1962 | Templeton | ............ A01F 15/042 100/272 |
| 5,913,801 A | 6/1999 | Boettinger | |
| 7,146,294 B1 * | 12/2006 | Waitkus, Jr. | .......... B30B 9/3007 702/188 |
| 9,622,418 B2 * | 4/2017 | Smith | .................... A01F 15/101 |
| 9,823,147 B2 * | 11/2017 | Verhaeghe | ................ G01L 5/00 |
| 2009/0217827 A1 * | 9/2009 | Duenwald | ........... A01F 15/0715 100/88 |
| 2009/0235628 A1 * | 9/2009 | Derstine | ............... A01F 15/005 56/341 |

(Continued)

FOREIGN PATENT DOCUMENTS

EP 2870858 A1 5/2015

OTHER PUBLICATIONS

UK Intellectual Property Office, International Search Report prepared for related UK Application No. GB1601889.7, dated Aug. 4, 2016.

*Primary Examiner* — Atul Trivedi

(57) ABSTRACT

A system and method for producing a bale having a target weight set by a user. A processor compares stored actual weights to the target weight, and, based on a difference, adjusts the bale-forming process. The processor may calculate a load value for a connecting rod, measure an actual load value for the rod, and, based on a difference, set a new pressure value for the process, and then repeat these steps until the bale is fully formed. The processor may determine a first line relating a calculated load on the connecting rod to a current pressure, determine a second line relating a measured load on the rod to the current pressure, identify a pressure value at the intersection of the first and the second lines, and make this the new pressure value for the process, and then repeat these steps until the bale is fully formed.

14 Claims, 5 Drawing Sheets

(56) References Cited

U.S. PATENT DOCUMENTS

| | | | |
|---|---|---|---|
| 2012/0048129 A1* | 3/2012 | Smith | A01F 15/08 100/2 |
| 2013/0042770 A1* | 2/2013 | Verhaeghe | A01F 15/0825 100/35 |
| 2013/0180417 A1* | 7/2013 | Vandamme | A01F 15/0825 100/35 |
| 2013/0180418 A1* | 7/2013 | Bonte | A01F 15/0825 100/185 |
| 2013/0319263 A1* | 12/2013 | Roberts | A01F 15/0825 100/43 |
| 2014/0224135 A1* | 8/2014 | Van Amstel | A01F 15/0825 100/3 |
| 2014/0291038 A1* | 10/2014 | Hague | G01G 19/10 177/1 |
| 2015/0025757 A1 | 1/2015 | Dumarey et al. | |
| 2015/0167861 A1* | 6/2015 | Ferrer Herrera | F16K 37/0041 239/73 |
| 2015/0208586 A1* | 7/2015 | Lang | A01F 15/0825 100/2 |
| 2015/0257340 A1* | 9/2015 | Anstey | A01F 15/0883 701/49 |
| 2016/0109309 A1* | 4/2016 | Verhaeghe | A01F 15/0825 701/41 |
| 2017/0167630 A1* | 6/2017 | Ferrer Herrera | F16K 37/0041 |
| 2017/0265398 A1* | 9/2017 | Retzlaff | A01F 15/0841 |
| 2017/0354092 A1* | 12/2017 | Lang | A01F 15/08 |

\* cited by examiner

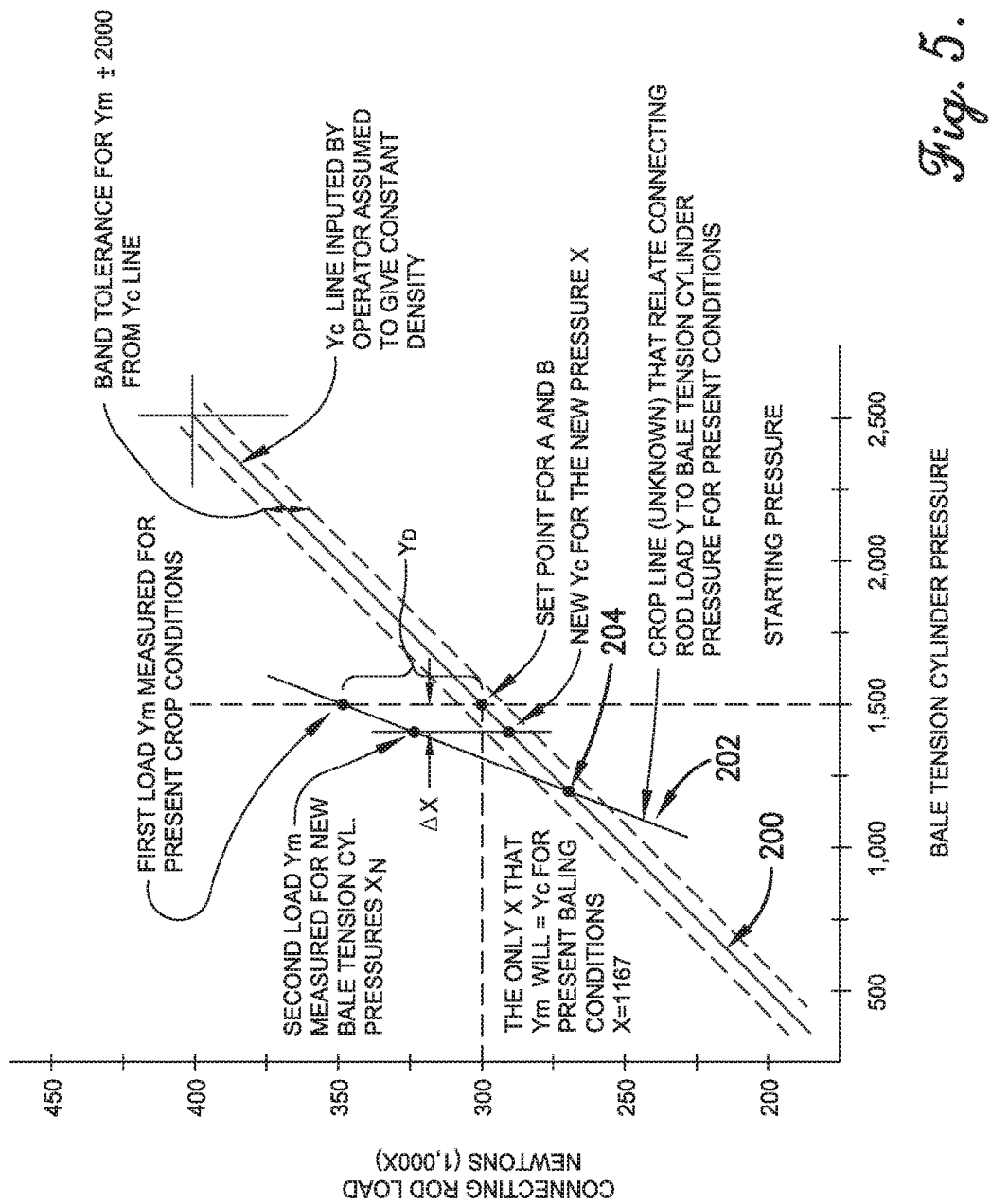

SYSTEM AND METHOD FOR CONTROLLING BALE WEIGHT

CROSS REFERENCE TO RELATED APPLICATION

This application claims the benefit of U.S. Provisional Application No. 62/262,256 filed Dec. 2, 2015, which is hereby incorporated by reference in its entirety.

FIELD

The present invention relates to systems and methods for controlling the operation of balers. In particular, the present invention concerns a system and method for controlling the densities and/or weights of bales produced by large agricultural balers.

BACKGROUND

Large square balers are used in the agricultural industry to create large substantially rectangular bales of crop material by moving over crop windrows to collect loose crop material, compress it, and form it into bales that are then bound and ejected. To that end, a baler is typically mechanically coupled with a tractor, and a power take-off (PTO) mechanism transfers power from the tractor's engine to drive the baler's operation. A rotary pick-up at the front of the baler collects the loose crop material and moves it into a feeder chute. Once the feeder chute is full, its contents are moved into a forming chamber. A reciprocating plunger compresses the crop material in the forming chamber into a growing bale. Once the bale reaches a predetermined length, which could be eight feet, it is tied and ejected through a discharge outlet to fall onto the ground behind the baler. The process then continues to create the next bale.

Higher density balers can produce bales that exceed desired or acceptable bale weights. Bales of particular weights may be desired for various reasons, including ensuring that the balers' drive and structural systems are not overloaded and that transport trucks do not exceed their maximum payloads. Current load control systems for controlling bale weights often use simple algorithms that are based on the load on the plunger but that often fail to sufficiently control bale weights for various reasons, such as crop variations during field baling. Furthermore, these systems are primarily designed to protect the balers, and are only secondarily designed to have some ability to control bale weight. As a result, the weights of bales produced on the same day from the same crop in the same field may vary by more than one hundred pounds or even by several hundred pounds.

This background discussion is intended to provide information related to the present invention which is not necessarily prior art.

SUMMARY

Embodiments of the present invention solve the above-described and other problems and limitations by providing a system and method for controlling balers to produce bales having more consistent densities and/or weights, thereby avoiding both overloading the balers' drive and structural systems and exceeding transport truck payloads, and giving users greater control over the weights of their bales. An exemplary baler may include a forming chamber in which the bale is produced, a tension mechanism configured to apply a pressure to the bale in the forming chamber, a plunger configured to compress the bale in the forming chamber, and a connecting rod configured to transfer mechanical force to the plunger.

In a first embodiment of the present invention, a system for controlling the baler to produce a bale having approximately a target bale weight may broadly comprise an interface element, a memory element, and a processing element. The interface element may be configured to allow a user to set the baler to prioritize producing the bale having approximately the target bale weight over one or more other potential control priorities, and to allow the user to set the target bale weight. The memory element may be configured to store one or more actual bale weights of one or more prior bales produced by the baler. The processing element may be configured to compare the actual bale weights to the target bale weight, and if the actual bale weights are not within a pre-established range of the target bale weight, determine and cause to be applied a new pressure value for the tension mechanism.

In a one implementation of the system, the new pressure value may be determined by calculating a calculated load value for the connecting rod; measuring an actual load value for the connecting rod; if the calculated load value is not within a pre-established range of the actual load value, setting the new pressure value based on a difference between the calculated load value and the actual load value; and repeating the foregoing steps until the baler has produced the bale. In an additional or alternative implementation of the system, the new pressure value may be determined by determining a first line that relates a calculated load on the connecting rod to the pressure applied by the tension mechanism; determining a second line that relates a measured load on the connecting rod to the pressure applied by the tension mechanism; identifying a particular pressure value at an intersection of the first line and the second line; setting the new pressure value to the identified particular pressure value; and repeating the foregoing steps until the baler has produced the bale.

In a second embodiment of the present invention, a method for controlling the baler to produce a bale having approximately a target bale weight may broadly comprise the following steps. An interface element may be provided to allow a user to set the baler to prioritize producing the bale having approximately the target bale weight over one or more other potential control priorities, and to allow the user to set the target bale weight. An electronic memory element may store one or more actual bale weights of one or more prior bales produced by the baler. An electronic processing element may compare the actual bale weights to the target bale weight; and if the actual bale weights are not within a pre-established range of the target bale weight, the electronic processing element may determine and cause to be applied a new pressure value for the tension mechanism.

In one implementation of the method, the new pressure value may be determined by the electronic processing element by calculating a calculated load value for the connecting rod; measuring an actual load value for the connecting rod; if the calculated load value is not within a pre-established range of the actual load value, setting the new pressure value based on a difference between the calculated load value and the actual load value; and repeating the foregoing steps until the baler has produced the bale. In an additional or alternative implementation of the method, the new pressure value may be determined by the electronic processing element by determining a first line that relates a calculated load on the connecting rod to the pressure applied by the tension mechanism; determining a second line that relates a measured load on the connecting rod to the pressure applied by the tension mechanism; identifying a particular pressure value at an intersection of the first line and the second line; setting the new pressure value to the identified particular pressure value; and repeating the foregoing steps until the baler has produced the bale.

In various implementations of the foregoing embodiments and implementations, the system and method may further include any one or more of the following additional features. The one or more other potential control priorities may include controlling a load on the plunger. The processing element may notify the user if the target bale weight cannot be achieved under current baling conditions, and may further notify the user of an achievable bale weight which is as close as possible under the current baling conditions to the target bale weight. The user may be allowed to set the baler to prioritize producing the bale having approximately the target bale weight and to set the target bale weight from a remote location over a wireless communication network. One or more sensors may generate additional information relevant to achieving the target bale weight, and the processing element may consider the additional information in determining the new pressure value for the tension mechanism. The additional information relevant to achieving the target bale weight may include any one or more of a load on the plunger, a pressure in the forming chamber, a moisture content of a crop being baled, a size of the crop, a thickness of a flake component of the bale, a length of the flake component, a forward ground speed of the baler, a position of the baler, a time, a temperature, and a relative humidity.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 5 is plot of a load on a connecting rod component of the system of FIG. 1 versus a pressure applied by a tension mechanism component of the system.

Figure 1:
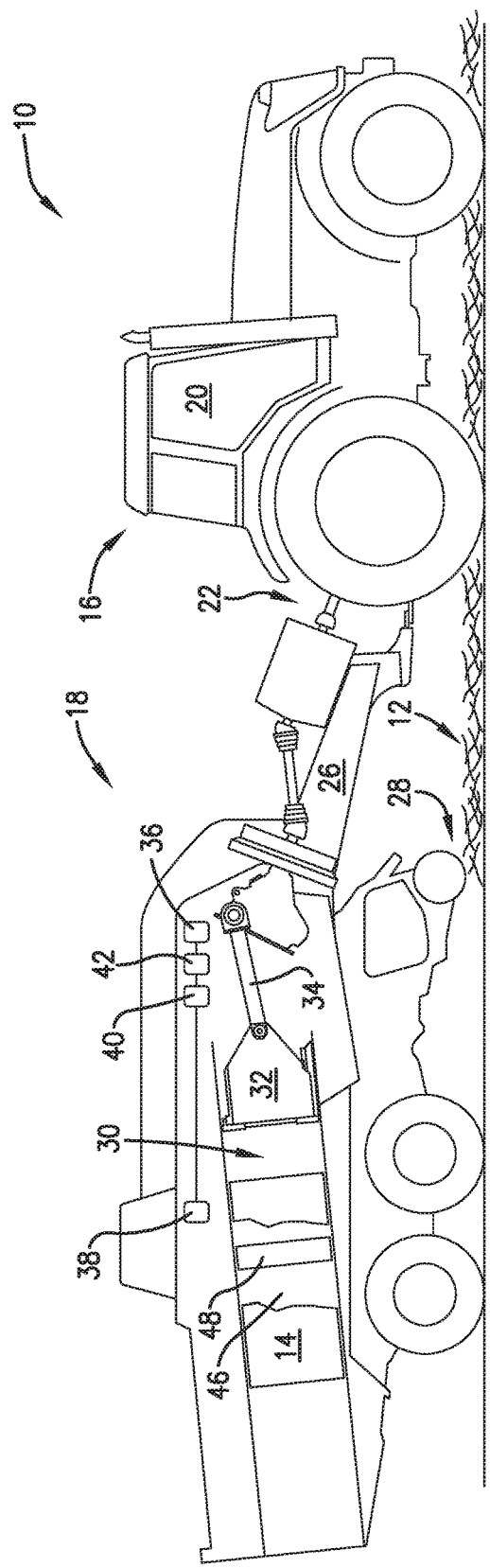
FIG. 1 is a cross-sectional elevation view of a system constructed in accordance with an embodiment of the present invention.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides a system and method for controlling a baler to produce bales having more consistent densities and/or weights, thereby avoiding both overloading the baler's drive and structural systems and exceeding a transport truck's maximum payload, and giving a user more control over the weights of their bales. More specifically, embodiments of the system and method allow for adjusting the bale-forming process, including the pressure applied to the growing bales, to produce bales that more closely meet the user's weight requirement.

Embodiments of the system and method may provide the user with the option to prioritize achieving a desired bale weight, in contrast to prior art systems and methods which prioritize or only enable controlling a plunger load. When this option is exercised, bale weight load control may become the primary control function, and plunger load control may become the secondary control function. In the bale weight load control mode, the system may compare a stored array of prior actual bale weights to the user's desired bale weight. Additionally, the system and method may further consider stored arrays of other data associated with the production of the prior bales. The sizes of these stored arrays may vary based on the amounts and types of available data. Based on the stored array of prior bale weights and, if available, the stored arrays of other relevant data, the system and method may periodically or continually adjust a plunger load by changing the pressure in one or more forming chamber tension mechanisms in order to achieve the desired bale weight. If the desired bale weight cannot be achieved, the system and method may inform the user, and may also inform the user of the closest achievable bale weight. The system and method may further allow the user to remotely monitor (using, e.g., fixed or mobile computers or communication devices such as smartphones) and set the baler's controls to optimize bale production.

Referring to FIG. 1, an exemplary system 10 constructed in accordance with an embodiment of the present invention may be configured to receive loose crop material 12, form it into a charge (or "flake"), and compress the charge with one or more other charges to form a bale 14 having at least approximately a target bale weight. The system 10 may broadly comprise a tractor 16 and a baler 18. The tractor 16 may include a cab 20 for accommodating an operator; an engine configured to move the tractor 16; and a PTO 22 configured to transfer mechanical power from the engine to the baler 18 to drive the bale-forming process. The baler 18 may broadly comprise a frame 26 mechanically coupled with the tractor 16; a loose crop material receiving and stuffing component 28; a forming chamber 30; a plunger 32; an interface element 36; one or more sensors 38; a memory element 40; and a processing element 42.

The loose crop material receiving and stuffing component 28 may be configured to collect the loose crop material 12 from the ground, pre-compress it into individual charges, and move the charges into the forming chamber 30 for incorporation into the growing bale 14. The loose crop material receiving and stuffing component 28 may include a collector component operable to pick-up the loose crop material from the ground, a cutter component operable to cut the collected loose crop material 12 into smaller pieces, and a feeder component operable to pre-compress the loose crop material 12 to form the charge and then feed the charge into the forming chamber 30. The feeder component may include a feeder chute extending between the collector component (or cutter component, if so equipped) and a feeder chute outlet at the forming chamber 30 and through which the loose crop material moves from the former to the latter, one or more packing forks operable to pack the collected loose crop material 12 into the feeder chute in such a manner as to pre-compress the loose crop material 12 into the charge, and a stuffer fork operable to move the pre-compressed charge into the forming chamber 30 via the feeder chute outlet.

The forming chamber 30 may be configured to receive the charge so that it can be compressed by the plunger 32 into the growing bale 14. The forming chamber 30 may be substantially rectangular in shape to facilitate the compression and forming process. The plunger 32 may be configured to compress the charge into the growing bale 14 by moving within the forming chamber 30 in a reciprocating manner. More specifically, the plunger 32 may repeatedly extend into the forming chamber 30 to compress the charges that are already present therein, and retract to allow the next charge to enter the forming chamber 30 via the feeder chute outlet. The forming chamber 30 may include one or more moveable walls 46 and one more tension mechanisms 48. The moveable walls 46 may be configured to at least partly define a shape and dimension of the forming chamber 30 and a shape and dimension of the growing bale 14. The tension mechanisms 48, which may be, e.g., hydraulic cylinders, may be configured to apply force to the moveable walls 46 to further facilitate compacting the charge of crop material into the growing bale 14 and controlling the density and/or weight of the growing bale 14.

The interface element 36 may be configured to allow the user to set the baler 18 to prioritize achieving the desired bale weight over one or more other potential control priorities, such as controlling the load on the plunger 32, and to allow the user to set a target bale weight. The interface element 36 may take any suitable form, such as physical or virtual pushbuttons, selector switches, touchscreens, or combinations thereof, for allowing the user to communicate with the system 10. The interface element 36 may be located on the tractor 16 (e.g., in the cab 20), on the baler 18, and/or on a fixed or mobile computing device, such as a desktop, laptop, or tablet computer or a smartphone.

The one or more sensors 38 may be appropriately located in, e.g., the forming chamber 30 and/or in the feeder chute leading to the forming chamber 30, and configured to generate information relevant to achieving the target bale weight, such as a load on the plunger, a pressure in the forming chamber, a moisture content of a crop being baled, a size of the crop, a thickness of a flake component of the bale, a length of the flake, a forward ground speed of the baler, a position of the baler, a time, a temperature, and/or a relative humidity. For example, at least one or the sensors 38 may be a near infra-red sensor or a microwave sensor configured to determine the moisture content of the flakes or the bale 14.

The memory element 40 may be configured to store the input provided via the interface element 36 and the information generated by the one or more sensors 38, including density/and or weight data for one or more prior bales 14 produced by the baler 18. The memory element 40 may be substantially any suitable data storage device, such as an electronic data storage device.

The processing element 42 may be configured to access the information stored in the memory element 40 and, based thereon, control the operation of the plunger 32, moveable walls 46 and tension mechanisms 48, and/or other components involved in forming the bale 14 so as to at least approximately achieve the target bale weight specified by the user. The processing element 42 may be substantially any suitable device, such as an electronic control unit (ECU), configured to perform the steps of the exemplary method described below.

Figure 2:
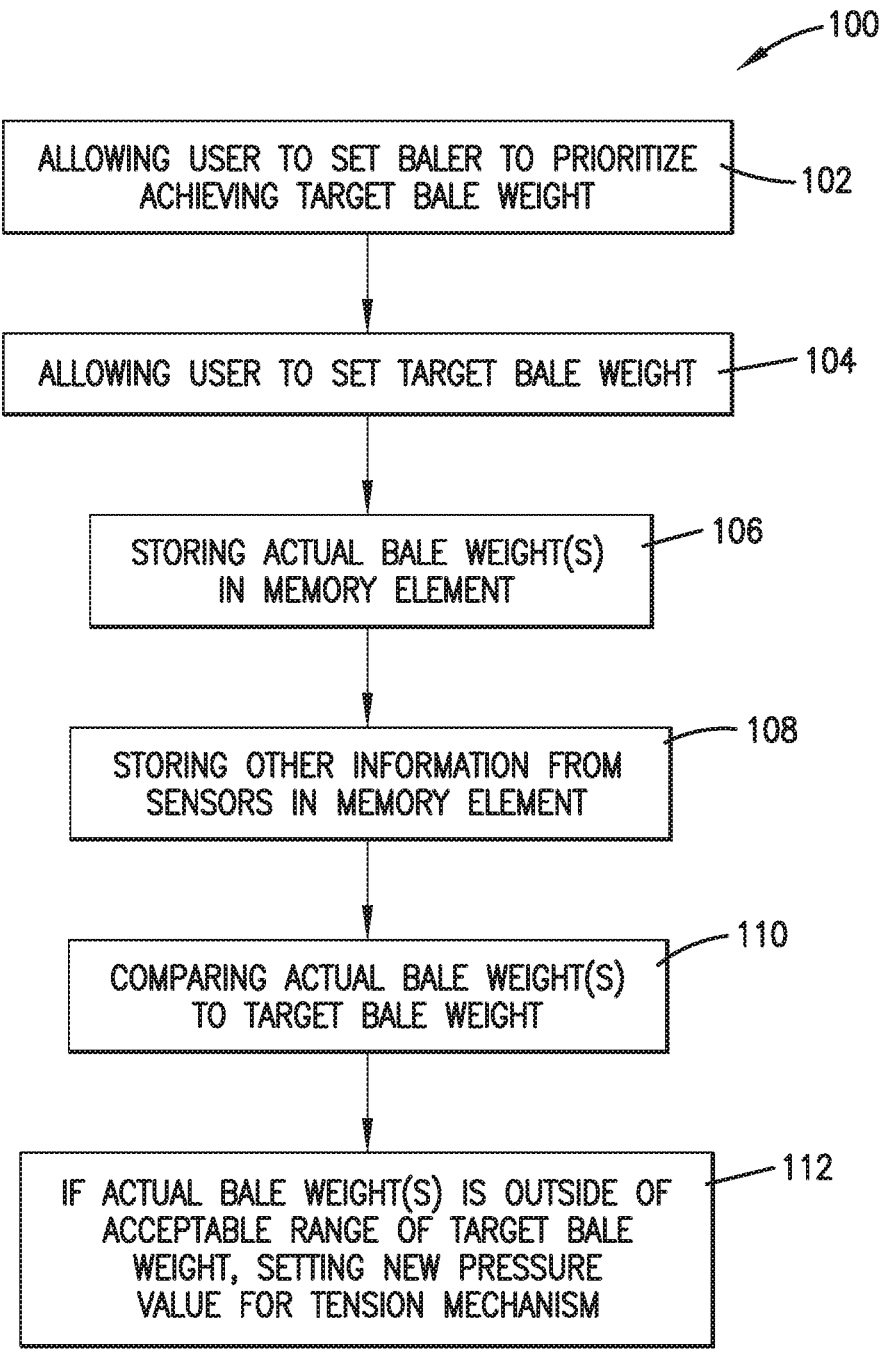
FIG. 2 is a flow diagram of method steps performed by an embodiment of the system of FIG. 1.

Referring to FIG. 2, a method 100 practiced in accordance with an embodiment of the present invention may comprise the following steps to produce a bale 14 having at least approximately (i.e., equal to or within a pre-established range of +/−20%, or +/−10% of) a target bale weight. A user may be allowed to use the interface element 36 to set the baler 18 to prioritize achieving the target bale weight over one or more other potential control priorities, as shown in step 102. The one or more other potential control priorities may include, e.g., controlling a load on the plunger 32. The user may also be allowed to use the interface element 36 to set the target bale weight, as shown in step 104. One or more actual bale weights of one or more prior bales produced by the baler 18 may be stored in the memory element 40, as shown in step 106. Additional information received from the one or more sensors 38 and relevant to achieving the target bale weight may be stored in the memory element information 40, as shown in step 108. The additional information relevant to achieving the target bale weight may include such information as a load on the plunger 32, a pressure in the forming chamber 30, a moisture content of the crop being baled, a size of the crop, a thickness of a flake component of the bale, a length of the flake, a forward ground speed of the baler 18, a position of the baler 18, a time, a temperature, and a relative humidity. The actual bale weights of the prior bales produced by the baler 18 may be compared by the processing element 42 to the target bale weight specified by the user, as shown in step 110. If the actual bale weights are not within the pre-established range of the target bale weight, the processing element 42 may adjust the bale-forming process by, e.g., determining and causing to be applied a new pressure value for the tension mechanism 48 in order to more closely achieve the target bale weight, as shown in step 112. In determining the new pressure to be applied by the tension mechanism 48, the processing element 42 may consider the additional information providing by the one or more sensors 38.

Figure 3:
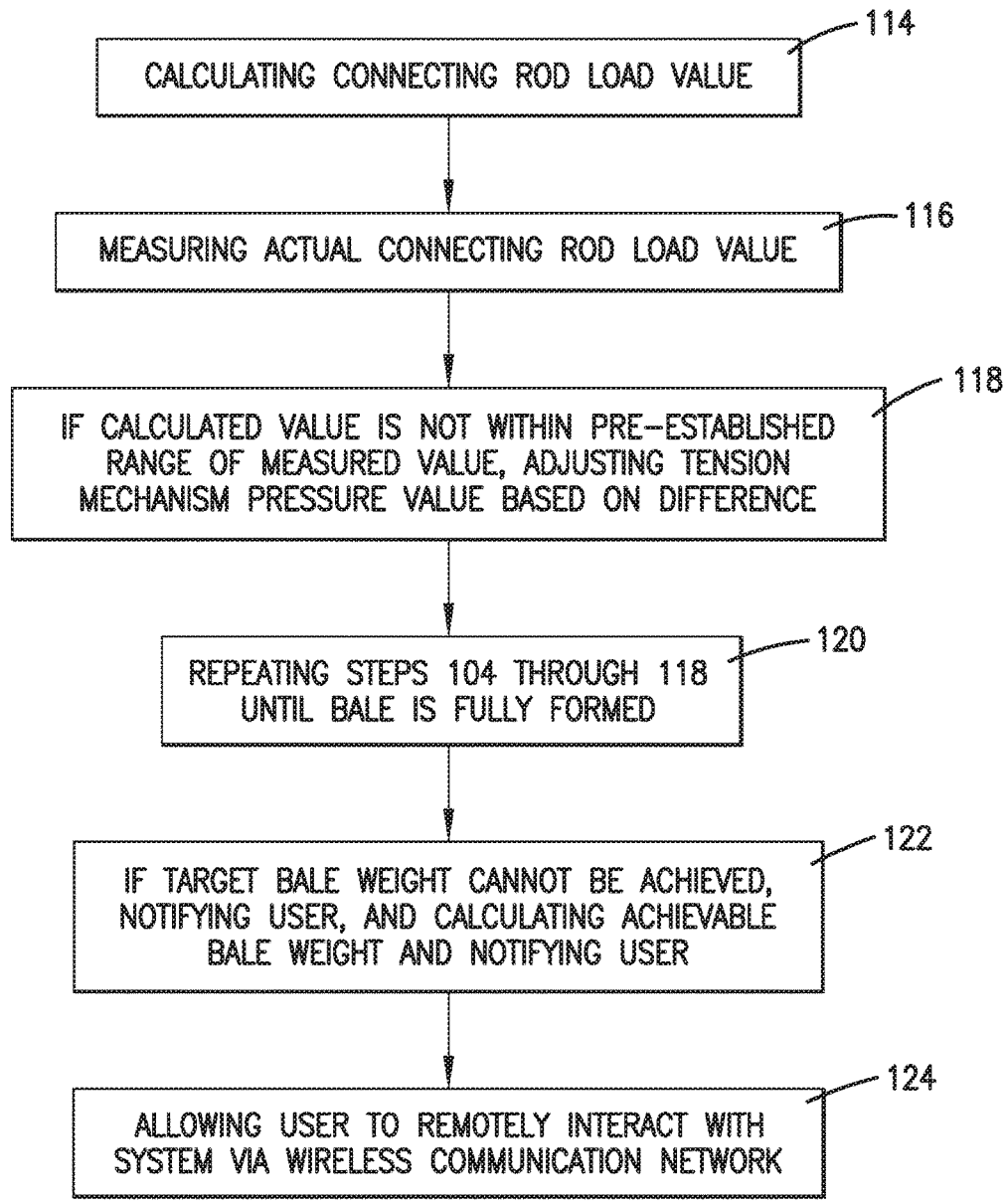
FIG. 3 is a flow diagram of method steps performed by one implementation of the embodiment of FIG. 2.

Referring to FIG. 3, in one implementation, the processing element 42 may determine the new pressure value as follows. The processing element 42 may calculate a load value for the connecting rod component 34 of the plunger 32, as shown in step 114. The processing element 42 may measure an actual load value for the connecting rod component 34, as shown in step 116. If the calculated load value is not equal to or within a pre-established range (i.e., +/−20%, or +/−10%) of the actual load value, the processing element 42 may set the new pressure value based on the difference between the calculated and actual load values, as shown in step 118. The processing element 42 may repeat steps 108 through 118 continually or periodically (e.g., after each charge, or flake, is added) until the bale 14 is finished forming, as shown in step 120.

If the target bale density and/or weight cannot be achieved under the current baling conditions, the processing element 42 may notify the user, and may further calculate and notify the user of the achievable actual bale weight which is as close as possible under the current baling conditions to the target bale weight, as shown in step 122. The method may further include the step of allowing the user to set the target bale weight from a remote location over a wireless communication network, as shown in step 124.

Figure 4:
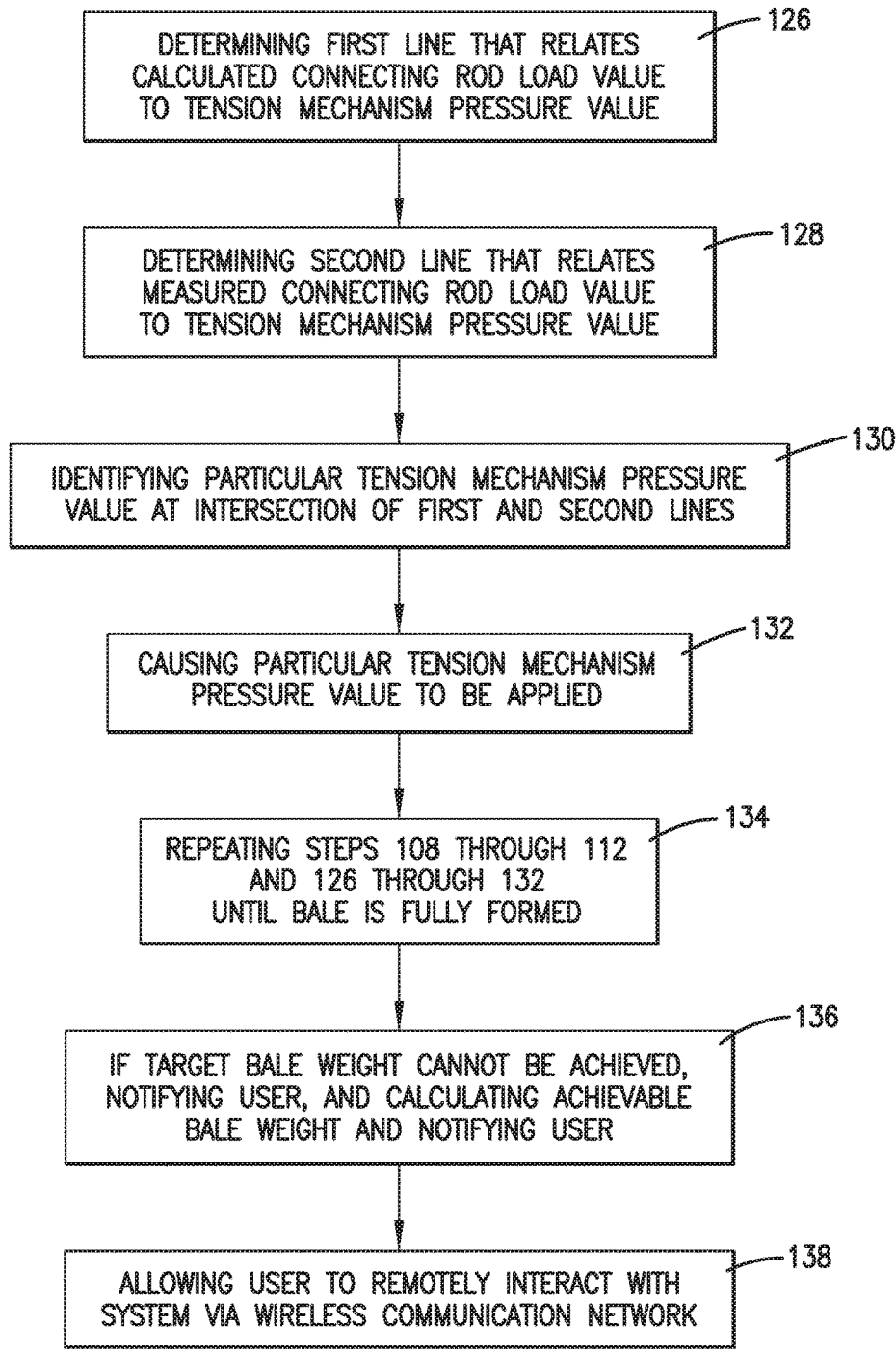
FIG. 4 is a flow diagram of method steps performed by an additional or alternative implementation of the embodiment of FIG. 2.

Referring also to FIG. 4, in an additional or alternative implementation, the processing element 42 may determine the new pressure value as follows. The processing element 42 may determine a first line that relates a calculated load value for the connecting rod component 34 to a current pressure value for the tension mechanism 48, as shown in step 126. The processing element 42 may determine a second line that relates a measured load value for the connecting rod component 34 to current the pressure value for the tension mechanism 48, as shown in step 128. The processing element 42 may identify a particular pressure value at an intersection of the first line and the second line, as shown in step 130. The processing element 42 may make the particular pressure value the new pressure value, as shown in step 132. The processing element 42 may repeat steps 108 through 112 and 126 through 132 continually or periodically (e.g., after each charge, or flake, is added) until the bale 14 is finished forming, as shown in step 134.

Again if the target bale density and/or weight cannot be achieved under the current baling conditions, the processing element may notify the user, and may further calculate and notify the user of the achievable actual bale density and/or weight which is as close as possible under the current baling conditions to the target bale density and/or weight, as shown in step 136. The method may further include the step of allowing the user to set the target bale density and/or weight from a remote location over a wireless communication network, as shown in step 138.

Referring also to FIG. 5, an exemplary bale density control algorithm for use with the system and method of the present invention may be substantially as follows. In the slope equation:

$$Y_c = A \times X + B$$

wherein X is the current pressure value for the tension mechanism 48, $Y_c$ is the load on the connecting rod 34 calculated for X, and X is controlled by the processing element 42. The processing element 42 may read the measured connecting rod load, $Y_m$, compare $Y_m$ to $Y_c$, and adjust X based on:

$$\Delta X = (Y_c - Y_m) \times C$$

wherein C is a constant percentage. This process may then be repeated, with a new $Y_c$ being calculated for the new X and compared to the next $Y_m$. A first line 200 relates $Y_c$ to X.

A second line 202 relates $Y_m$ to X, and may depend on the forming chamber and the frictional characteristic of the crop at the time of baling. This line 202 has a different slope and may cross the first line 200. The point 204 at which these two lines 200, 202 cross is the particular pressure value that should result in $Y_m \approx Y_c$.

For example, when the baler 18 starts without any load data, the tension mechanism pressure may be set to an initial value, such as 1500 psi. The calculated $Y_c$, may be 300,000 N, and the measured $Y_m$, may be 350,000 psi, which indicates that the pressure should be decreased (if $Y_c$ were greater than $Y_m$, that would indicate the pressure should be increased). If the constant, C, is set to 0.2%, then the change in the pressure is −100 psi, resulting in a new pressure value of 1400 psi. Using this new pressure value, new $Y_c$, $Y_m$, and, if necessary, $\Delta X$ values can be determined until $Y_c \approx Y_m$. How closely $Y_c$ can approximate $Y_m$ may depend on the baler's tolerances and/or the user's needs or preferences. For example, it may be deemed sufficient if $Y_c - 2000$ N $\leq Y_m \geq Y_c + 2000$ N.

Additionally, or alternatively, the slope of the second line 202 may be determined, the anticipated intersection point 204 of the first and second lines 200, 202 may be determined, and the new pressure value may set to the particular pressure value which corresponds to that point 204. Given the slope equation (above), the slope, A, of the second line 202 is:

$$A = \frac{Y_{m1} - Y_{m2}}{X_1 - X_2}$$

Using the values from the preceding example, A is 250. The offset, B, of the second line 202 is:

$$B = Y_{m2} - AX_2$$

Again, using the values from the preceding example, B is −25,000. Solving for the value of X which corresponds to the intersection of the first and second lines 200, 202, the new pressure value is 1167 psi. For this value of X, $Y_c$ is 266,700 N, and $Y_m$ should approximate $Y_c$. If the first and second lines 200, 202 do not intersect between 750 and 2,500 psi, the system 10 may notify the user.

Thus, the present invention provides advantages over the prior art, including that it allows for controlling balers to produce bales having more consistent densities and/or weights, thereby avoiding both overloading the balers' drive and structural systems and exceeding transport truck payloads, and giving users greater control over the densities and weights of their bales.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for controlling a baler to produce a bale having approximately a target bale weight, the baler having a forming chamber in which the bale is produced, a tension mechanism configured to apply a pressure to the bale in the forming chamber, a plunger configured to compress the bale in the forming chamber, and a connecting rod configured to transfer mechanical force to the plunger, the system comprising:
   an interface element configured to allow a user to set the baler to prioritize producing the bale having approximately the target bale weight over one or more other potential control priorities, and to allow the user to set the target bale weight;

a memory element configured to store one or more actual bale weights of one or more prior bales produced by the baler; and a processing element configured to— compare the one or more actual bale weights to the target bale weight, and if the one or more actual bale weights are not within a pre-established range of the target bale weight, determine and cause to be applied a new pressure value for the tension mechanism, wherein the new pressure value is determined by—

(a) determining a first line that relates a calculated load on the connecting rod to the pressure applied by the tension mechanism, (b) determining a second line that relates a measured load on the connecting rod to the pressure applied by the tension mechanism, (c) identifying a particular pressure value at an intersection of the first line and the second line, (d) setting the new pressure value to the identified particular pressure value, and (e) repeating steps (a) through (d) until the baler has produced the bale.

2. The system as set forth in claim 1, wherein the one or more other potential control priorities includes controlling a load on the plunger.

3. The system as set forth in claim 1, wherein the processing element is further configured to notify the user if the target bale weight cannot be achieved under current baling conditions.

4. The system as set forth in claim 3, wherein the processing element is further configured to notify the user of an achievable bale weight which is as close as possible under the current baling conditions to the target bale weight.

5. The system as set forth in claim 1, wherein the processing element is further configured to allow the user to set the baler to prioritize producing the bale having approximately the target bale weight and to set the target bale weight from a remote location over a wireless communication network.

6. The system as set forth in claim 1, further including one or more sensors configured to generate additional information relevant to achieving the target bale weight, wherein the processing element is further configured to consider the additional information in determining the new pressure value for the tension mechanism.

7. The system as set forth in claim 6, wherein the additional information relevant to achieving the target bale weight is selected from the group consisting of: a load on the plunger, a pressure in the forming chamber, a moisture content of a crop being baled, a size of the crop, a thickness of a flake component of the bale, a length of the flake component, a forward ground speed of the baler, a position of the baler, a time, a temperature, and a relative humidity.

8. A method for controlling a baler to produce a bale having approximately a target bale weight, the baler having a forming chamber in which the bale is produced, a tension mechanism configured to apply a pressure to the bale in the forming chamber, a plunger configured to compress the bale in the forming chamber, and a connecting rod configured to transfer mechanical force to the plunger, the method comprising:

(a) providing an interface element configured to allow a user to set the baler to prioritize producing the bale having approximately the target bale weight over one or more other potential control priorities, and to allow the user to set the target bale weight;

(b) storing in an electronic memory element one or more actual weights of one or more prior bales produced by the baler;

(c) comparing with an electronic processing element the one or more actual bale weights to the target bale weight; and (d) if the one or more actual bale weights are not within a pre-established range of the target bale weight, determining with the electronic processing element and causing to be applied a new pressure value for the tension mechanism, wherein the new pressure value is determined by the electronic processing element by—

(e) determining a first line that relates a calculated load on the connecting rod to the pressure applied by the tension mechanism, (f) determining a second line that relates a measured load on the connecting rod to the pressure applied by the tension mechanism, (g) identifying a particular pressure value at an intersection of the first line and the second line, (h) setting the new pressure value to the identified particular pressure value, and (i) repeating steps (e) through (h) until the baler has produced the bale.

9. The method as set forth in claim 8, wherein the one or more other potential control priorities includes controlling a load on the plunger.

10. The method as set forth in claim 8, further including the step of the electronic processing element notifying the user if the target bale weight cannot be achieved under current baling conditions.

11. The method as set forth in claim 10, further including the step of the electronic processing element notifying the user of an achievable bale weight which is as close as possible under the current baling conditions to the target bale weight.

12. The method as set forth in claim 8, further including the step of allowing the user to set the baler to prioritize producing the bale having approximately the target bale weight and to set the target bale weight from a remote location over a wireless communication network.

13. The method as set forth in claim 8, further including generating with one or more sensors additional information relevant to achieving the target bale weight, and the electronic processing element considering the additional information in determining the new pressure value for the tension mechanism.

14. The method as set forth in claim 13, wherein the additional information relevant to achieving the target bale weight is selected from the group consisting of: a load on the plunger, a pressure in the forming chamber, a moisture content of a crop being baled, a size of the crop, a thickness of a flake component of the bale, a length of the flake component, a forward ground speed of the baler, a position of the baler, a time, a temperature, and a relative humidity.

* * * * *